United States Patent [19]

Ackley

[11] Patent Number: 4,500,012

[45] Date of Patent: Feb. 19, 1985

[54] CAPSULE HANDLING APPARATUS

[76] Inventor: E. Michael Ackley, 1273 N. Church St., Moorestown, N.J. 08057

[21] Appl. No.: 383,691

[22] Filed: Jun. 1, 1982

[51] Int. Cl.³ .............................................. B65H 9/08
[52] U.S. Cl. ..................................... 221/173; 221/266
[58] Field of Search ............... 221/171, 266, 211, 225, 221/233, 237, 169, 173, 263, 262, 162; 198/271, 287, 380

[56] References Cited

U.S. PATENT DOCUMENTS 1,023,061  4/1912  Archer ........................... 221/169 X
2,772,811  12/1956  Schaef ............................ 221/263 X
4,154,329  5/1979  Hildenbrand ....................... 221/169

Primary Examiner—Stanley H. Tollberg
Attorney, Agent, or Firm—Weiser & Stapler

[57] ABSTRACT

Capsule handling apparatus having a specially configured capsule carrier (50) which permits faster operation, ejection of misoriented capsules, and sizing of capsules having telescoping cap and body portions. A capsule is received in an elongated recess (50a) in a face of the carrier. A passage (50f), leading from an outside surface of the carrier into the recess, facilitates loading a capsule into the recess. In one form, the carrier recess has two compartments (50c, 50d). When a force (90) is imparted to a capsule tending to push the capsule through the passage, a properly oriented capsule hangs up on a wall (50e) between the compartments, while a misoriented capsule freely passes through the passage and is ejected. An oversized capsule having an end projecting from the passage is engaged by a guide (98) which pushes the projecting end of the capsule into the recess to size the capsule. The sizing operation may be accomplished with a second form of the carrier which has a single compartment recess rather than a two-compartment recess.

43 Claims, 12 Drawing Figures

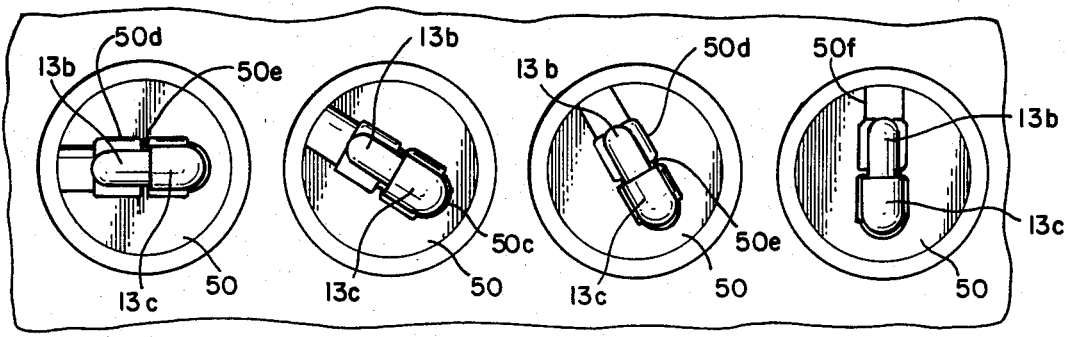
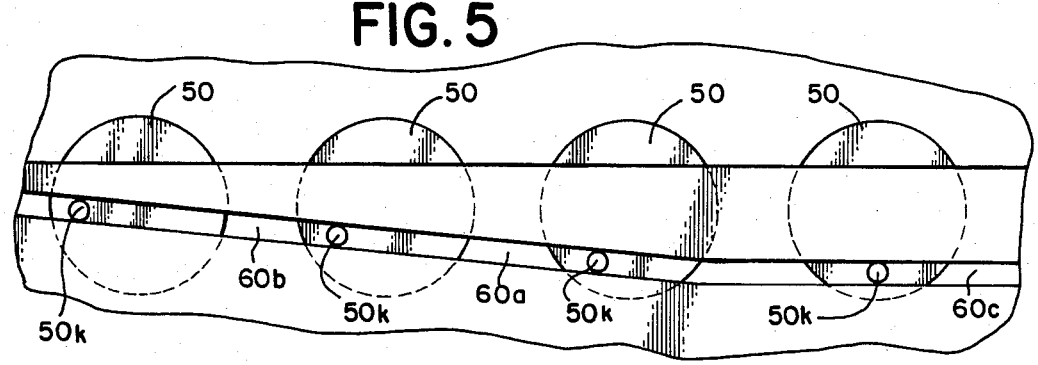
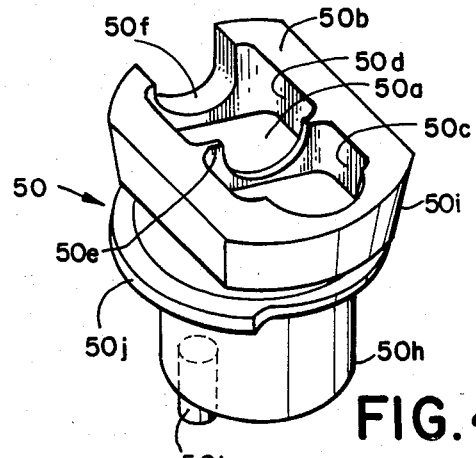
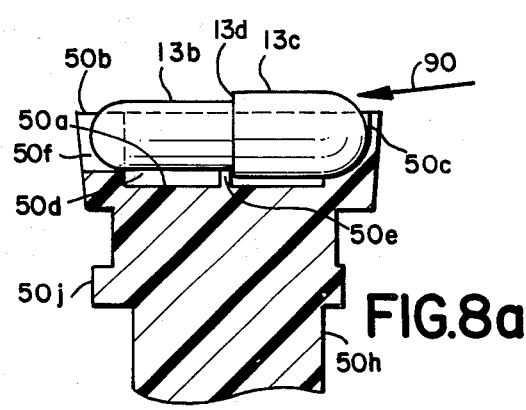
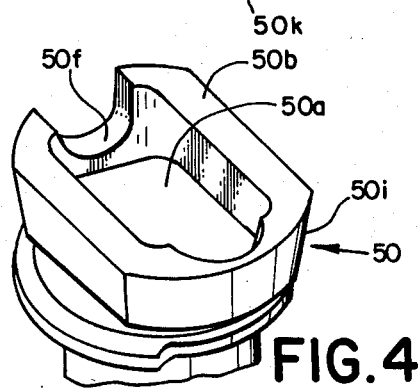
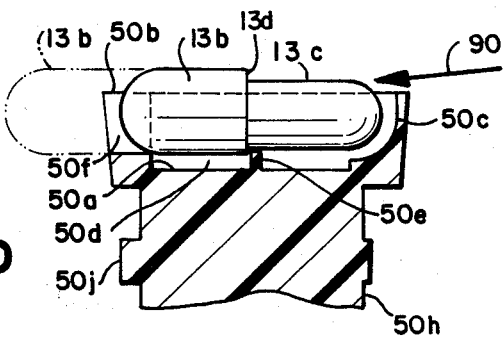

CAPSULE HANDLING APPARATUS

DESCRIPTION

1. Technical Field

The present invention relates, in general, to materials handling and, in particular, to apparatus for handling capsules having telescoping cap and body portions.

2. Background Art

Medicinal compounds commonly are supplied in ingestible two-part capsules having telescoping cap and body portions. It is the usual practice, in the preparation of such capsules, to imprint indicia on the surfaces of the capsules to indicate, for example, the name of the manufacturer or the batch from which the medicinal compound has been derived or to provide other information which may be required by the Food and Drug Administration or by other governmental agencies. Spin printing techniques often are used to imprint such capsules. Another commonly used technique involves printing on the capsule as the capsule axis is oriented in the direction of its movement past the printer.

The preferred procedure is to orient the capsules prior to imprinting, so that the indicia is applied at the same location on each capsule. This facilitates inspection of the capsules. Also, certain marking techniques require the capsules to be supplied in uniform orientation.

Many capsule orienting methods and apparatus have been suggested in the past and a variety have been adopted for use by the pharmaceutical industry. Despite the fact that much effort and expense has been made in the development of capsule orienting units, those in use today generally do not satisfy the concurrent requirements of high-speed operation, reliability, operational simplicity and reasonable cost. A major problem is that a small percentage of the capsules leave the orienting unit misoriented. Although the number of misoriented capsules may be small, the quality control requirements, as well as other considerations, make even this number of misoriented capsules unacceptable to drug manufacturers. This has required the addition of a visual inspection step after capsule orientation or capsule marking to segregate misoriented capsules and reduce the number of misoriented capsules which might otherwise pass through. Human inspection is costly, time consuming and still may result in an unacceptably high rate of misoriented or misprinted capsules not being separated out from those which are oriented and marked correctly.

Another problem with presently available equipment is the possibility that the indicia is imprinted at different points along the length of the capsule resulting in non-uniform capsules. Typically, the indicia is printed on assembled, but unfilled, capsules. To the extent that the capsules are assembled with varying degrees of engagement of the telescoping caps and bodies or that they partially separate as they are handled prior to imprinting, the indicia will be printed at different locations on the capsules.

Speed of operation of the equipment and cost always are a consideration. Users constantly seek higher operating speeds and lower cost machinery.

DISCLOSURE OF THE INVENTION

Accordingly, it is an objective of the present invention to provide new and improved apparatus for orienting capsules.

It is another objective of the present invention to provide capsule orienting apparatus which reduces considerably the number of capsules which might remain misoriented.

It is yet another objective of the present invention to provide capsule handling apparatus which produces uniformly printed capsules.

It is a further objective of the present invention to provide capsule handling apparatus which is efficient in design and operation.

A still further objective of the present invention is to provide capsule handling apparatus which is capable of running at relatively higher speeds than comparable equipment which is currently available.

These and other objectives are achieved by apparatus constructed in accordance with the present invention which includes means for supplying elongated articles each having two different diameter sections and an annular surface at the junction of the two sections. The apparatus also includes transporting means for moving the articles from one location to another. The transporting means include a plurality of carriers each having an elongated recess in a face thereof for receiving one of the articles lengthwise along the face. In one form of the invention, each recess has a single compartment with a passage extending along the longitudinal axis of the recess to an outside surface of the carrier and having a width at least as large as the diameter of the larger diameter section of the article. In a second form of the invention, each recess has first and second compartments separated by a wall disposed perpendicular to the longitudinal axis of the recess. The first compartment is at least as long as the length of the larger diameter section of the article to be received by the recess and the passage extends outward from the second compartment.

The particular arrangement of each carrier is important for three reasons. First, it facilitates loading the articles into the transporting means permitting a more rapid supply of articles to the transporting means and, in turn, permitting the transporting means to be operated more quickly.

Second, the carriers may serve to check the orientation of the articles supplied to the transporting means. Ejection means may be positioned adjacent the transporting means to impart movement to an article along its longitudinal axis from the wall between the compartments of the recess toward the passage which leads from the recess to the outside of the carrier. The annular surface at the junction of the two sections of the article abuts against the wall between the compartments for articles positioned with their larger diameter sections in the first compartment and consequently such articles are prevented from moving through the passages, while articles having their smaller diameter sections positioned in the first compartment move through the passages and are ejected from the transporting means.

The third feature of the carriers is that they permit sizing two-part articles arranged with a sliding relationship, such as telescoping cap and body portions of pharmaceutical capsules. Means may be positioned adjacent the transporting means for engaging the ends of any articles which project from the passages and for moving any such projecting ends inward of the recesses along the longitudinal axes of the articles.

BRIEF DESCRIPTION OF DRAWINGS

Referring to the drawings:

FIGS. 4a and 4b are perspective views of two article carriers which may used in the FIG. 1 apparatus;

FIG. 5 is an enlarged, sectional view taken along line 5—5 of FIG. 1;

FIG. 6 is an enlarged, plan view of a portion of the FIG. 1 apparatus;

FIGS. 8a and 8b are sectional views of the article carrier illustrated in FIG. 4a which show how this component serves to eject misoriented capsules;

BEST MODE OF CARRYING OUT THE INVENTION

Figure 1:
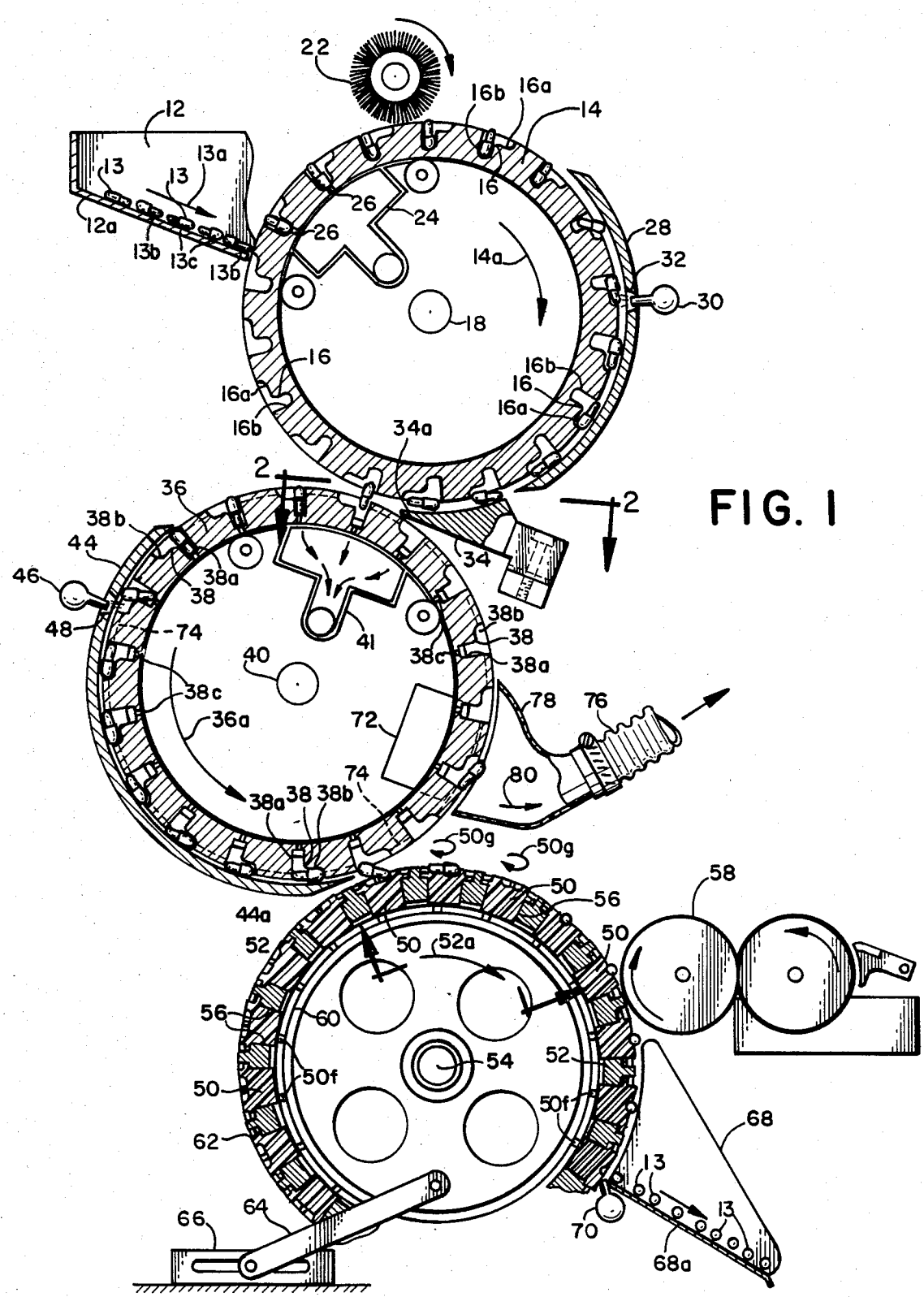
FIG. 1 is a sectional side view of apparatus constructed in accordance with the present invention.

Referring to FIG. 1, apparatus, constructed in accordance with the present invention, includes means for supplying, in random orientation, capsules having telescoping cap and body portions. Such means may include a hopper 12, of conventional construction and operation, from which a plurality of capsules 13 are supplied serially in the direction of an arrow 13a. Hopper 12 may be mounted upon a suitable support (not shown) and may include an inclined bottom surface 12a along which the capsules move to an opening at the bottom of the hopper from which the capsules emerge in random orientation. As shown, some of the capsules are oriented with their body portions 13b disposed forward, while others are oriented with their cap portions 13c disposed forward.

The FIG. 1 apparatus further includes rectifying means for receiving capsules 13 in random orientation and for delivering the capsules to a delivery point in uniform orientation. The rectifying means may include a transfer mechanism, in the form of a rotating drum 14, having a set of pockets 16 which receive the capsules from hopper 12 and move the capsules to the delivery point. Drum 14 is mounted for rotation about a rotation axis, defined by the axis of a shaft 18, and is arranged to rotate in the direction of an arrow 14a.

Each of the pockets 16 has a peripheral portion 16a formed on the surface of drum 14 and disposed in the direction of rotation of drum 14. In addition, for the embodiment of the invention illustrated in FIG. 1, each of the pockets 16 has a radial portion 16b. Capsules 13 are received in random orientation in the radially disposed portions 16b of pockets 16. The angle of inclination of hopper surface 12a is arranged to be in radial alignment with radial portions 16b of pockets 16. It should be noted, however, that hopper 12 and rotary drum 14 may be so arranged that capsules 13 may be fed in such a manner as to lay directly in peripheral portions 16a of pockets 16. A rotating brush 22 may be provided to assist in aligning and positioning capsules 13 in pockets 16.

A vacuum chest 24, of conventional construction and operation and located within rotating drum 14, may be provided to aid in seating capsules 13 within pockets 16. In such a case, through holes 26, extending from the bottoms of radial portions 16b of pockets 16 to the inside surface of drum 14, would be required to provide communication between pockets 16 and vacuum chest 24. The vacuum chest may be connected to a vacuum source by conventional means.

As drum 14 rotates and capsules 13 approach or pass through the horizontal of drum 14, the capsules move from radial portions 16b of pockets 16 to peripheral portions 16a. A back guide 28, positioned adjacent drum 14, limits the radially outward movement of capsules 13 and guides the capsules into peripheral portions 16a of pockets 16. In order to assure that capsules 13 will move into peripheral portions 16a of pockets 16, air under pressure may be applied from an air jet 30. Air jet 30 projects through an opening 32 in back guide 28 and supplies a jet stream of air which impinges upon the surfaces of pockets 16 to move capsules 13 radially outward into peripheral portions 16a of pockets 16. As a result, capsules 13 continue to move with drum 14 but now the capsules ride within peripheral portions 16a of pockets 16 as the pockets move below the horizontal of the drum.

The rectifying means further include a guide 34 positioned adjacent rotating drum 14. Guide 34 may be considered an extension of back guide 28. As shown most clearly in FIGS. 2 and 3, a nose portion 34a of guide 34 has a slot 34b which is aligned with pockets 16 and is sized to permit body portions 13b of capsules 13 to hang through the slot and prevent cap portions 13c of the capsules from passing through the slot. Each capsule 13 having its body portion 13b leading rotates about a horizontal axis from a peripheral position in peripheral portion 16a of pocket 16 to a radial position shortly after some portion of the capsule clears the innermost surface 34c of slot 34b. This is shown by capsule 13' in the lower track in FIG. 2. Each capsule 13 having its cap portion 13c leading rotates about a horizontal axis from a peripheral position in peripheral portion 16a of pocket 16 to a radial position after the entire capsule has cleared the innermost surface 34c of slot 34b. This is shown by capsule 13' in the upper track in FIG. 2. As a result, the capsules delivered by drum 14 to slotted nose portion 34a of guide 34 are positioned with the edges of their cap portions 13c resting on the edges of slot 34b and their body portions 13b hanging through the slot. This is shown by capsule 13'' in the lower track in FIG. 2.

The rectifying means may include a second transfer mechanism, in the form of a second rotating drum 36, having a set of pockets 38 for receiving capsules 13 from drum 14 and for moving the capsules to a discharge point. Drum 36 is mounted for rotation about a rotation axis, defined by the axis of a shaft 40, and is arranged for rotation in the direction of an arrow 36a.

Each of the pockets 38 has a recessed portion 38a disposed perpendicular to the direction of movement of drum 36. In particular, recessed portions 38a of pockets 38 are disposed radially of drum 36. Each recessed portion 38a of pocket 38 is adapted to receive rectified capsules 13 positioned with their cap portions 13c radially outward of the body portion 13b. This is shown most clearly in FIG. 3. Although the capsules which are delivered to drum 36 are rectified, from time-to-time a misoriented capsule will be delivered to drum 36. Recessed portions 38a of pockets 38 are sized to receive any such misoriented capsules having their cap portions 13c radially inward of the body portions 13b.

Shafts 18 and 40 of drums 14 and 36, respectively, are arranged parallel to one another so that the rotation axes of drums 14 and 36 are parallel and located on opposite sides of the path of movement of peripheral portions 16a of pockets 16. The movements of drums 14 and 36 are synchronized so that pockets 16 in drum 14 and pockets 38 in drum 36 arrive at the delivery point at the end of nose portion 34a of guide 34 at the same time.

As each capsule 13 clears the end of nose portion 34a of guide 34, it is free to move from a pocket 16 in drum 14 to a pocket 38 in drum 36. This is illustrated most clearly in FIGS. 2 and 3 which show two capsules 13‴ which have cleared the end of guide 34. Continued movement of the capsules past the end of nose portion 34a of guide 34 permits the transfer of the capsules from drum 14 to drum 36. Each capsule 13 disposed in the desired orientation, namely with its body portion 13b hanging downwardly through slot 34b of guide 34, will be received in a recessed portion 38a of a pocket 38 with its body portion radially inward of drum 36. Any capsule 13 which is misoriented, namely with its cap portion 13c disposed downwardly, will be received in a recessed portion 38a of a pocket 38 with its cap portion radially inward of drum 36.

A vacuum chest 41, of conventional construction and operation and located within drum 36, may be used to draw capsules 13 from pockets 16 into pockets 38 after the capsules clear nose portion 34a of guide 34. In particular, vacuum chest 41 is in fluid communication with recessed portions 38a of pockets 38 via through-holes 38c. As the capsules move into slot 34b of guide 34, they feel the effect of vacuum chest 41 and shift from lying in the peripheral portions 16a of pockets 16 to the radial positions as previously described.

As drum 36 rotates and capsules 13 approach or pass through the horizontal of drum 36, the capsules which are loosely held in recessed portions 38a of pockets 38 move from a radial position in the recessed portions of the pockets to a peripheral position in peripheral portions 38b of these pockets. A back guide 44, positioned adjacent drum 36, limits the radially outward movement of capsules 13 and guides the capsules into the peripheral portions 38b of pockets 38. In order to assure that the capsules will move into the peripheral portions 38b of pockets 38, air under pressure may be applied from an air jet 46. Air jet 46 projects through an opening 48 in back guide 44 and supplies a jet stream of air which impinges upon the surfaces of pockets 38 to move the loosely held capsules radially outward into peripheral portions 38b of pockets 38. After being shifted from recessed portions 38a of pockets 38 to peripheral portions 38b, capsules 13 continue to move with drum 36 to a discharge point.

Recessed portions 38a and peripheral portions 38b of pockets 38 are sized and shaped to loosely hold capsules which are received. However, from time-to-time, certain capsules may be either over-sized or received in such a way that they are jammed in recessed portions 38a or peripheral portions 38b of pockets 38 rather than being held and carried loosely.

As capsules 13 pass end 44a of back guide 44, the loosely held capsules are discharged from pockets 38 into a plurality of carriers 50 which are mounted at the periphery of a rotating drum 52. Two different capsule carriers are shown in FIGS. 4a and 4b. Each carrier has an elongated recess 50a in a face 50b adapted to receive a capsule 13 lengthwise in face 50b. Recess 50a is sized to hold a capsule loosely to permit the capsule to rotate about its longitudinal axis during a spin printing operation. For the carrier shown in FIG. 4a, each recess 50a has a pair of compartments 50c and 50d separated by a wall 50e disposed perpendicular to the longitudinal axis of the recess. The length of compartment 50c is at least as long as the length of cap portion 13c of the capsules. Compartment 50d has a passage 50f which extends along the longitudinal axis of recess 50a to an outside surface of the carrier. Passage 50f is at least as wide as the diameter of cap portion 13c of the capsules.

Drum 52 is mounted for rotation about a rotation axis, defined by the axis of a shaft 54, and is arranged for rotation in the direction of an arrow 52a. Shaft 54 is arranged parallel to shafts 18 and 40 so that the rotation axes of drums 14, 36 and 52 are parallel. The movements of drums 36 and 52 are synchronized so that pockets 38 in drum 36 and recesses 50a in carriers 50 arrive at end 44a of back guide 44 at the same time. Carriers 50 are journalled for rotation, as indicated by a pair of arrows 50g in FIG. 1, within a plurality of bearings 56.

Each carrier 50 has a cylindrical lower base portion 50h and an upper recess portion 50i which contains recess 50a. Lower base portion 50h is shown as having a smaller diameter than upper recess portion 50i and the portions are separated by a locking ring 50j which holds carriers 50 in position on drum 52.

Carriers 50 and drum 52 serve to deliver capsules 13 to a spin printing unit 58 with the capsules oriented properly. Spin printing unit 58 may be of conventional construction and operation. As drum 52 rotates in the direction of arrow 52a, carriers 50 move from the discharge point of drum 36 to spin printing unit 58. At the same time, each carrier rotates in the direction of arrows 50g, thereby shifting capsules 13 from a position extending in the direction of rotation of drum 52 to a position extending transverse to the direction of rotation of drum 52. This result may be achieved in a number of ways. For the embodiment of the invention being described, each carrier 50 is provided with a follower pin 50k extending downward from lower base portion 50h and offset from the axis of the carrier. Follower pin 50k functions as an eccentric which, in combination with a cam arrangement 60 causes the carrier to rotate. Cam arrangement 60 is secured to a stationary barrel 62 which is positioned within drum 52 and concentric with drum 52. The position of barrel 62 may be adjusted by a torque arm 64 slidably mounted on an adjustment bracket 66. Sliding torque arm 64 along bracket 66 causes barrel 62 to rotate, thereby advancing or retarding the timing function represented by camming arrangement 60 and, thus, rotation of carriers 50.

Camming arrangement 60 may take the form of a peripheral slotted ring which extends around barrel 62. Pin followers 50k of carriers 50 engage the slot in camming ring 60 so that the carriers are positioned with recesses 50a extending in the direction of rotation of drum 52 at the point where capsules 13 are received in recesses 50a. FIG. 5 shows the progressive movement of follower pins 50k as they advance through a slot 60a in camming ring 60 and FIG. 6 shows the corresponding progressive rotation of carriers 50 carrying capsules 13. Each carrier, as it reaches the point at which capsules are discharged from pockets 38, is oriented with passage 50f trailing in the direction of rotation of drum 52. Passage 50f facilitates loading the capsule into the carrier, thereby permitting drums, 52, 36 and 14 to be operated at a higher rotational speed. After passing the loading point, carriers 50 rotate 90° as follower pins 50k advance along a ramp portion 60b of camming ring 60 to a straightaway portion 60c of the camming ring. At some point after spin printing and discharge of capsules 13 from carriers 50, follower pins 50k follow a reverse ramp (not shown) in camming ring 60 to return the carriers to their original position to receive another capsule.

After the printing operation by spin printing unit 58, the printed capsules 13 are discharged from carriers 50 onto a delivery tray 68. The capsules roll down a sloping bottom surface 68a of delivery tray 68 for further processing. An air jet 70 may be provided at delivery tray 68 to assure discharge of the capsules from carriers 50.

Figure 7:
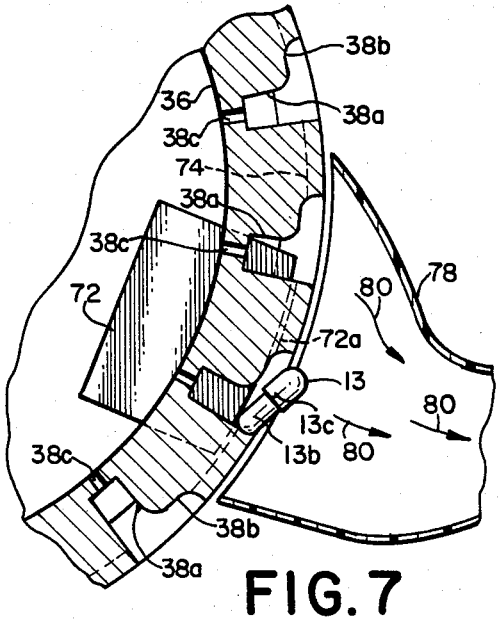
FIG. 7 is an enlarged, sectional view of a portion of the FIG. 1 apparatus.

Those capsules 13 which are tightly held in recessed portions 38a or peripheral portions 38b of pockets 38 in drum 36 are not discharged from pockets 38 into recesses 50a in carriers 50. These capsules pass the discharge point and are ejected at a position downstream from the discharge point. As best seen in FIG. 7, the ejection means may include a knock-out member 72 positioned within drum 36 between the discharge point of drum 36 and the point at which capsules are transferred from drum 14 to drum 36. Knock-out member 72 extends into a groove 74 which runs along the inside surface of drum 36 through recessed portions 38a of pockets 38. Face 72a of knock-out member 72 is shaped to push capsules 13 radially outward to loosen the capsules from either recessed portion 38a or peripheral portions 38b of pockets 38. After capsules 13 have been loosened sufficiently from recessed portions 38a or peripheral portions 38b of pockets 38, removal of the capsules is aided by a vacuum applied through a hose 76 and housing 78. This vacuum serves to draw away the capsules as indicated by arrows 80 in FIGS. 1 and 7.

Figure 2:
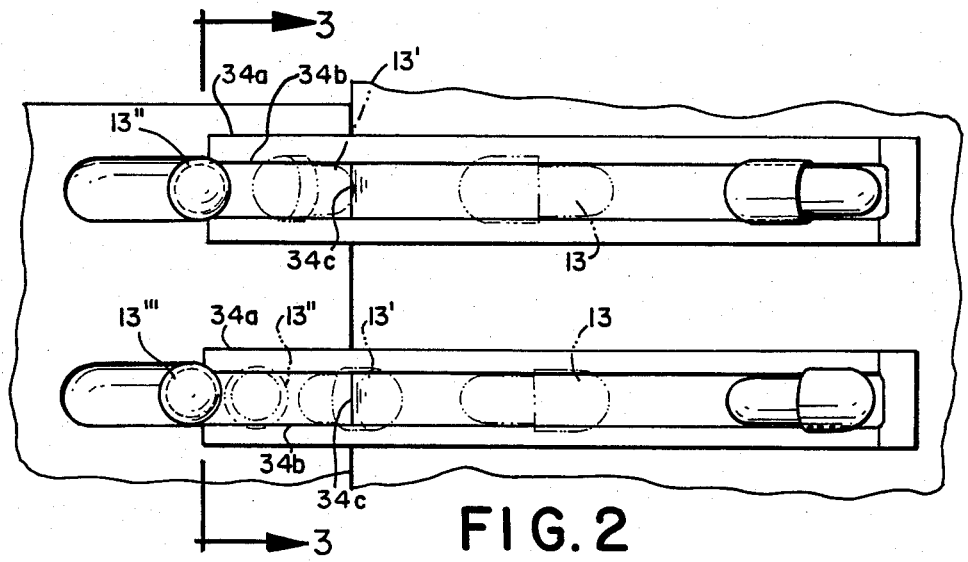
FIG. 2 is an enlarged, sectional view taken along line 2—2 of FIG. 1.
Figure 3:
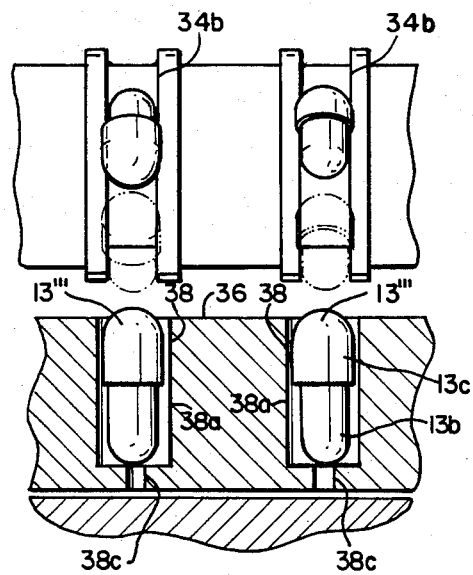
FIG. 3 is a sectional view taken along line 3—3 of FIG. 2.

As shown by FIGS. 2 and 3, drums 14 and 36 may be arranged with a plurality of sets of pockets 16 and 38, respectively. In such a case, a corresponding number of sets of carriers 50 would be provided on drum 52.

From time-to-time, a misoriented capsule may be discharged from a recess 38 to a carrier 50. In order to segregate such misoriented capsules, ejection means may be provided for imparting movement to each capsule along the longitudinal axis in the direction from wall 50e between the two compartments in the carrier recess toward passage 50f. Those capsules which are oriented properly with their cap portions in compartment 50c will remain in their carrier because the edge of the cap portion will abut wall 50e. A misoriented capsule having its body portion in compartment 50c will move along its axis through passage 50f and be ejected. FIGS. 8a and 8b are sectional views of a carrier 50 and show the manner in which a properly oriented capsule 13 is retained in the carrier (FIG. 8a) and a misoriented capsule is ejected from the carrier (FIG. 8b). As seen in FIG. 8a, when a force is imparted to capsule 13 in the direction of arrow 90, edge 13d of cap portion 13c abuts against wall 50e. With capsule 13 misoriented, as shown in FIG. 8b, a force imparted in the direction of arrow 90 is effective to eject the capsule through passage 50f as shown by the phantom lines.

Figure 9:
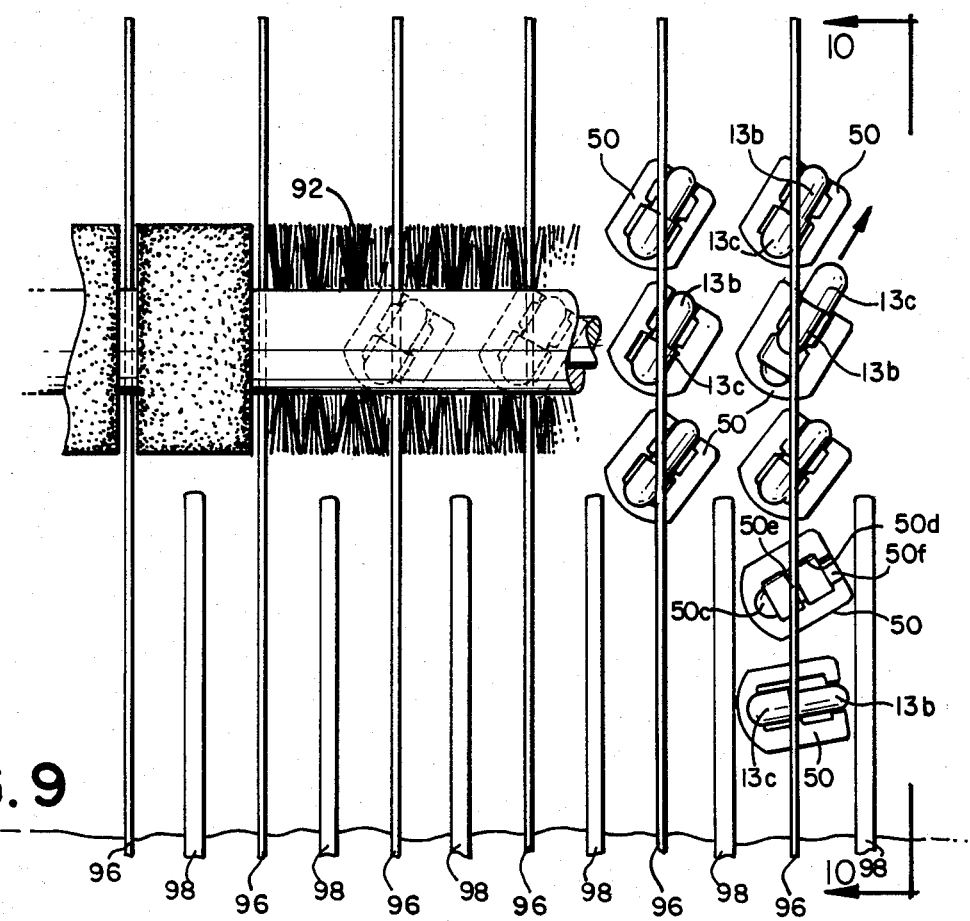
FIG. 9 is a front view of apparatus, constructed in accordance with the present invention, for ejecting misoriented capsules, and sizing capsules.
Figure 10:
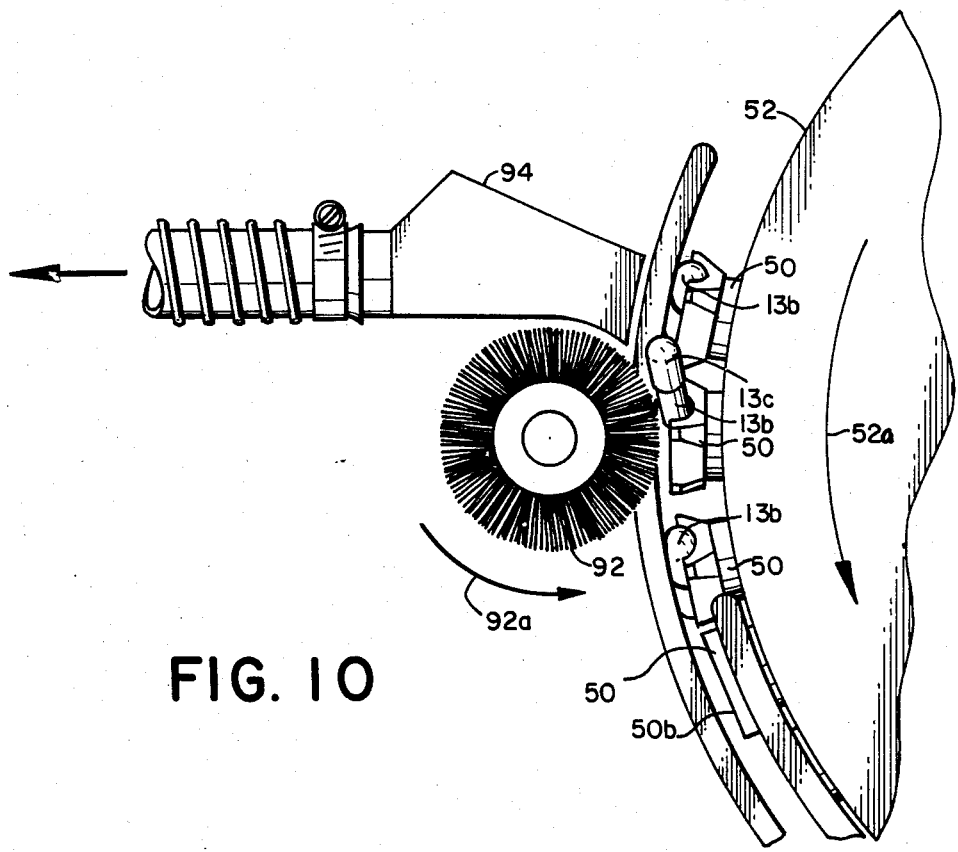
FIG. 10 is a vertical section taken along line 10—10 of FIG. 9.

FIGS. 9 and 10 show apparatus which may be used to eject misoriented capsules from carriers 50. Such apparatus may include a rotating brush 92 positioned adjacent drum 52 and mounted by suitable means. Brush 92 rotates in the direction of arrow 92a which is opposite to the direction of rotation of drum 52. Preferably, brush 92 is located between the point at which the capsules are loaded into the carriers and spin printing unit 58 at a position where the carriers have undergone a partial rotation. For the embodiment illustrated in FIGS. 9 and 10, brush 92 is positioned at a point where carriers 50 have been rotated approximately 30° from their orientation at the point where capsules 13 were received.

As capsules 13 pass rotating brush 92, the brush causes each capsule to rotate about its axis in carrier 50 and move along its axis toward passage 50f. Properly oriented capsules remain in their carriers, while misoriented capsules are ejected. In order to facilitate removal and recovery of ejected capsules, a suitable suction system 94 may be provided in the vicinity of rotating brush 92. A plurality of rails 96 are positioned above the centerline of the paths of movement of the capsules to prevent properly oriented capsules from being drawn away by suction system 94.

The apparatus shown, in FIGS. 9 and 10 also may include sizing means for engaging the end of any body portion 13b of a capsule which projects from a passage 50f of a carrier and for moving any such projecting body portion along the axis of the capsule from the passage toward separating wall 50e. For the particular embodiment illustrated in FIGS. 9 and 10, the sizing means include a plurality of guides 98, one for each set of carriers 50, which extend in the direction of rotation of drum 52 and progressively engage body portions 13b as the carriers are turned 90°. In order to accommodate different size capsules, guides 98 are movable along the axis of drum 52.

As indicated above, the preferred procedure for imprinting indicia on pharmaceutical capsules is to orient the capsules prior to printing. For those applications where uniform imprinting is not required, recess 50a in capsule carrier 50 may be arranged as a single compartment, as shown in FIG. 4b, instead of having two compartments as shown in FIG. 4a. The provision of passage 50f still offers the features of faster loading and capsule sizing when using the capsule carrier shown in FIG. 4b. When capsule rectification is not a concern, capsule sizing may be effected when either the cap portion or the body portion project from passage 50f.

Copending application Ser. No. 258,745 filed on Apr. 29, 1981 shows an alternative arrangement for intermediate drum 36 which may be used in the present invention. The particular apparatus shown in this copending application is intended to reduce the number of misoriented capsules which are delivered to capsule carriers 50, so that when incorporated in the present invention, the likelihood of printing misoriented capsules is reduced very greatly.

While in the foregoing there have been described preferred embodiments of the invention, it should be understood to those skilled in the art that various modifications and changes can be made without departing from the true spirit and scope of the invention as recited in the claims.

I claim:

1. A carrier for handling an elongated article having two different diameter sections and an annular surface at the junction of said sections, said carrier having an elongated recess in a face thereof adapted to receive said article lengthwise along said face, said recess having first and second compartments separated by a wall disposed perpendicular to the longitudinal axis of said recess, said first compartment being at least as long as the length of the larger diameter section of said article and said second compartment having a passage extending along said longitudinal axis of said recess to an outside surface of said carrier, said passage being at least as wide as the diameter of said larger diameter section of said article.

2. A carrier according to claim 1 further having a cylindrical base portion extending perpendicular to said face.

3. A carrier according to claim 2 further having a pin extending away from the bottom of said cylindrical base portion and offset from the axis of said cylindrical base portion.

4. Apparatus for handling elongated articles each having two different diameter sections and an annular surface at the junction of said sections, said apparatus comprising:

means for supplying said articles;

and transporting means for moving said articles from one location to another, said transporting means including a plurality of carriers each having an elongated recess in a face thereof for receiving one of said articles lengthwise along said face, said recess having first and second compartments separated by a wall disposed perpendicular to the longitudinal axis of said recess, said first compartment being at least as long as the length of the larger diameter section of said article and said second compartment having a passage extending along said longitudinal axis of said recess to an outside surface of said carrier, said passage being at least as wide as the diameter of said larger diameter section of said article.

5. Apparatus according to claim 4 wherein said transporting means further include a rotating drum having said carriers mounted at the periphery thereof.

6. Apparatus according to claim 5 wherein said carriers are mounted for rotation from a position extending in the direction of rotation of said drum to a position extending transverse to the direction of rotation of said drum.

7. Apparatus according to claim 4 wherein said carriers are mounted for rotation from a position extending in the direction of movement of said transporting means to a position extending transverse to the direction of movement of said transporting means.

8. Apparatus according to claim 7 wherein said supplying means include:

means for supplying said articles in random orientation;

and rectifying means for delivering said articles in uniform orientation.

9. Apparatus for handling elongated articles each having two different diameter sections and an annular surface at the junction of said sections, said apparatus comprising:

means for supplying said articles;

transporting means for moving said articles from one location to another, said transporting means including a plurality of carriers each having an elongated recess in a face thereof for receiving one of said articles lengthwise along said face, said recess having first and second compartments separated by a wall disposed perpendicular to the longitudinal axis of said recess, said first compartment being at least as long as the length of the larger diameter section of said article and said second compartment having a passage extending along said longitudinal axis of said recess to an outside surface of said carrier, said passage being at least as wide as the diameter of said larger diameter section of said article;

and ejection means positioned adjacent said transporting means for imparting movement to said articles along their longitudinal axes from said walls of said carriers toward said passages of said carriers, whereby the annular surfaces of said articles having their larger diameter sections positioned in said first compartments of said carriers abut said walls and are prevented from moving through said passages and said articles having their smaller diameter sections positioned in said first compartments move through said passages.

10. Apparatus according to claim 9 wherein said carriers are mounted for rotation from a position extending in the direction of movement of said transporting means to a position extending transverse to the direction of movement of said transporting means.

11. Apparatus according to claim 10 wherein said ejection means are positioned at a point where said carriers are oriented between a position extending in the direction of movement of said transporting means and a position extending transverse to the direction of movement of said transporting means.

12. Apparatus according to claim 11 wherein said ejection means include a rotating brush.

13. Apparatus according to claim 12 wherein said transporting means further include a rotating drum having said carriers mounted at the periphery thereof and said rotating brush rotates in a direction opposite to the direction of rotation of said rotating drum.

14. Apparatus according to claim 13 wherein said ejection means further include suction means for removing articles which move through said passages in said carriers.

15. Apparatus according to claim 14 wherein said transporting means further include a rail positioned above said carriers and extending in the direction of movement of said tranporting means for retaining in said carriers articles which are prevented from moving through said passages in said carriers.

16. Apparatus for handling elongated articles each having different diameter telescoping cap and body portions, and an annular surface at the junction of said portions, said apparatus comprising:

means for supplying said articles;

transporting means for moving said articles from one location to another, said transporting means including a plurality of carriers each having an elongated recess in a face thereof for receiving one of said articles lengthwise along said face, said recess having first and second compartments separated by a wall disposed perpendicular to the longitudinal axis of said recess, said first compartment being at least as long as the length of the cap portion of said article and said second compartment having a passage extending along said longitudinal axis of said recess to an outside surface of said carrier, said passage being at least as wide as the diameter of said cap portion of said article;

and sizing means positioned adjacent said transporting means for engaging the ends of any body portions of said articles which project from said passages of said carriers and for moving any such projecting cap portions along said longitudinal axes from said passages toward said walls of said carriers.

17. Apparatus according to claim 16 wherein said sizing means include a guide extending in the direction of movement of said transporting means.

18. Apparatus according to claim 17 wherein said transporting means further include a rotating drum having said carriers mounted at the periphery thereof.

19. Apparatus for handling elongated articles each having different diameter telescoping cap and body portions and an annular surface at the junction of said portions, said apparatus comprising:
supplying means for supplying said articles;
transporting means for moving said articles from one location to anothwer, said transporting means including a plurality of carriers each having an elongated recess in a face thereof for receiving one of said articles lengthwise along said face, said recess having first and second compartments separated by a wall disposed perpendicular to the longitudinal axis of said recess, said first compartment being at least as long as the length of the cap portion of said article and said second compartment having a passage extending along said longitudinal axis of said recess to an outside surface of said carrier, said passage being at least as wide as the diameter of said cap portion of said article;
ejection means positioned adjacent said transporting means for imparting movement to said articles along their longitudinal axes from said walls of said carriers toward said passages of said carriers, whereby the annular surfaces of said articles having their cap portions positioned in said first compartments of said carriers abut said walls and are prevented from moving through said passages and said articles having their body portions positioned in said first compartments move through said passages;
and sizing means positioned adjacent said transporting means for engaging the ends of any body portions of said articles which project from said passages of said carriers and for moving any such projecting body portions along said longitudinal axes from said passages toward said walls of said carriers.

20. Apparatus according to claim 19 wherein each of said carriers further include a cylindrical base portion extending perpendicular to said face.

21. Apparatus according to claim 20 wherein each of said carriers further includes a pin extending away from the bottom of said cylindrical base portion and offset from the axis of said cylindrical base portion.

22. Apparatus according to claim 19 wherein said carriers are mounted for rotation from a position extending in the direction of movement of said transporting means to a position extending transverse to the direction of movement of said transporting means.

23. Apparatus according to claim 22 wherein said ejection means are positioned at a point where said carriers are oriented between a position extending in the direction of movement of said transporting means and a position extending transverse to the direction of movement of said transporting means.

24. Apparatus according to claim 23 wherein said ejection means include a rotating brush.

25. Apparatus according to claim 24 wherein said transporting means further include a rotating drum having said carriers mounted at the periphery thereof and said rotating brush rotates in a direction opposite to the direction of rotation of said rotating drum.

26. Apparatus according to claim 25 wherein said ejection means further include suction means for removing articles which move through said passages in said carriers.

27. Apparatus according to claim 26 wherein said transporting means further include a rail positioned above said carriers and extending in the direction of movement of said transporting means for retaining in said carriers articles which are prevented from moving through said passages in said carriers.

28. Apparatus according to claim 27 wherein said sizing means include a guide extending in the direction of movement of said transporting means.

29. Apparatus according to claim 28 wherein said supplying means include:
means for supplying said articles in random orientation;
and rectifying means for delivering said articles in uniform orientation.

30. A carrier for handling an elongated article having two diffent diameter sections and an annular surface at the junction of said sections, said carrier having a recess in a face thereof adapted to receive said article lengthwise, said recess comprised of first and second axially aligned compartments separated by a wall defining a surface of said first compartment adapted to engage said annular surface of said article when the larger diameter section of said article is positioned in said first compartment and the smaller diameter section of said article is positioned in said second compartment, said second compartment having an axially extending passage at the end opposite from said wall and sized to permit axial movement of the entire length of said article through said passage.

31. A carrier according to claim 30 further having a cylindrical base portion extending perpendicular to said face.

32. A carrier according to claim 31 further having a pin extending away from the bottom of said cylindrical base portion and offset from the axis of said cylindrical base portion.

33. A carrier for handling an elongated article, said carrier having an elongated recess longitudinally extending along a face thereof more than halfway across said face and adapted to receive said article lengthwise so that the axis of said article extends generally along said face, a first end of said recess being closed, and a second end of said recess opposite the first end having a passage extending along said longitudinal axis of said recess to an outside surface of said carrier, said passage being at least as wide as the largest diameter of said article.

34. A carrier according to claim 33 further having a cylindrical base portion extending perpendicular to said face.

35. A carrier according to claim 34 further having a pin extending away from the bottom of said cylindrical base portion and offset from the axis of said cylindrical base portion.

36. Apparatus for handling elongated articles comprising:

means for supplying said articles;

and transporting means for moving said articles from one location to another, said transporting means including a plurality of carriers each having an elongated recess longitudinally extending along a face thereof more than halfway across said face for receiving one of said articles lengthwise so that the axis of said article extends generally along said face, a first end of said recess being closed, and a second end of said recess opposite the first end having a passage extending along said longitudinal axis of said recess to an outside surface of said carrier, said passage being at least as wide as the largest diameter of said article.

37. Apparatus according to claim 36 wherein said transporting means further include a rotating drum having said carriers mounted at the periphery thereof.

38. Apparatus for handling elongated articles comprising:

means for supplying said articles;

transporting means for moving said articles from one location to another, said transporting means including a plurality of carriers each having an elongated recess in a face thereof for receiving one of said articles lengthwise along said face, said recess having a passage extending along said longitudinal axis of said recess to an outside surface of said carrier, said passage being at least as wide as the largest diameter of said article;

and said sizing means positioned adjacent said transporting means for engaging the ends of any of said articles which project from said passages of said carriers and for moving any such projecting ends inward of said recesses along said longitudinal axes.

39. Apparatus according to claim 38 wherein said sizing means include a guide extending in the direction of movement of said transporting means.

40. Apparatus according to claim 39 wherein said transporting means further include a rotating drum having said carriers mounted at the periphery thereof.

41. Apparatus for handling elongated articles comprising:

means for supplying said articles; and transporting means for moving said articles from one location to another, said transporting means including a rotating drum and a plurality of carriers mounted at the periphery of said drum;

wherein each of said carriers has an elongated recess in a face thereof for receiving one of said articles lengthwise along said face, said recess having a passage extending along said longitudinal axis of said recess to an outside surface of said carrier, said passage being at least as wide as the largest diameter of said article; and wherein said carriers are mounted for rotation from a position extending in the direction of rotation of said drum to a position extending transverse to the direction of rotation of said drum.

42. Apparatus for handling elongated articles comprising:

means for supplying said articles; and transporting means for moving said articles from one location to another, said transporting means including a plurality of carriers each having an elongated recess in a face thereof for receiving one of said articles lengthwise along said face, said recess having a passage extending along said longitudinal axis of said recess to an outside surface of said carrier, said passage being at least as wide as the largest diameter of said article;

wherein said carriers are mounted for rotation from a position extending in the direction of movement of said transporting means to a position extending transverse to the direction of movement of said transporting means.

43. Apparatus according to claim 38 wherein the end of said article opposite said engaged end is maintained essentially stationary, thereby compressing said ends of the article when engaged by said sizing means.

* * * * *